United States Patent [19]

Liles

[11] Patent Number: 5,082,873
[45] Date of Patent: Jan. 21, 1992

[54] UV CURABLE SILICONE EMULSIONS

[75] Inventor: Donald T. Liles, Midland, Mich.

[73] Assignee: Dow Corning Corporation, Midland, Mich.

[21] Appl. No.: 605,896

[22] Filed: Oct. 30, 1990

Related U.S. Application Data

[62] Division of Ser. No. 355,223, May 22, 1989.

[51] Int. Cl.$^5$ .................. C08G 77/06; C08K 3/30
[52] U.S. Cl. ........................... 522/86; 522/99; 524/837; 528/23
[58] Field of Search ............... 522/84, 99, 86; 524/837; 528/23

[56] References Cited

U.S. PATENT DOCUMENTS

| | | | |
|---|---|---|---|
| 4,273,634 | 6/1981 | Saam et al. | 522/86 |
| 4,370,160 | 1/1983 | Ziemelis | 524/862 |
| 4,782,112 | 11/1988 | Kondo et al. | 524/837 |
| 4,954,565 | 9/1990 | Liles | 524/837 |
| 4,962,153 | 10/1990 | Liles | 524/837 |
| 4,978,710 | 12/1990 | Liles | 524/837 |

*Primary Examiner*—Marion E. McCamish
*Assistant Examiner*—Susan Berman
*Attorney, Agent, or Firm*—Edward C. Elliott

[57] ABSTRACT

A silicone emulsion is prepared by emulsion polymerizing a hydroxyl endblocked polydiorganosiloxane oligomer with a combination of a siloxane or siloxane precursor containing unsaturated hydrocarbon groups and a functional silicone selected from the group consisting of organosilicon hydrides and mercaptoalkylsilanes or siloxanes, or with an acryl or methacryl functional siloxane. When the emulsion of the copolymer produced is combined with a photoinitiator, the copolymer can be crosslinked by exposure to ultraviolet radiation. When the water is removed, an elastomer results. The emulsion can be used to produce coatings and sealants.

20 Claims, No Drawings to the emulsion to provide a tougher product.
UV CURABLE SILICONE EMULSIONS This is a divisional of copending application Ser. No. 07/355,223 filed on May 22, 1989.

BACKGROUND OF THE INVENTION

1. Field of the Invention

This invention relates to an aqueous silicone emulsion which produces an elastomeric product upon irradiation with ultraviolet light and removal of the water.

2. Background Information

U.S. Pat. No. 4,052,529, issued Oct. 4, 1977, discloses compositions consisting essentially of a mixture of a triorganosiloxane-endblocked polydiorganosiloxane fluid in which from 1 to 5 percent of the organic radicals are mercaptoalkyl radicals and a methylvinylpolysiloxane which is radiation curable. U.S. Pat. No. 4,064,027, issued Dec. 20, 1977 teaches a composition which consists essentially of a siloxane consisting essentially of from 0.5 to 100 mole percent of vinyl siloxane containing units and a siloxane containing at least one silicon bonded hydrogen atom that is curable upon exposure to ultraviolet light.

A latex of crosslinked silicone is prepared in U.S. Pat. No. 4,248,751, issued Feb. 3, 1981, by emulsifying a vinyl endblocked polydiorganosiloxane and an organosilicon compound having silicon-bonded hydrogen atoms with water and a surfactant, adding platinum catalyst, and then heating the emulsion. Colloidal silica can be added to the emulsion to provide a tougher product.

U.S. Pat. No. 4,273,634, issued June 16, 1981, teaches an emulsion comprising a continuous water phase and a dispersed phase of crosslinked silicone. The silicone phase is the product of radical produced crosslinking of hydroxyl endblocked polydiorganosiloxane which was crosslinked after it had been dispersed in water.

A process for preparing microspheres of solid organopolysiloxane is described in U.S. Pat. No. 4,370,160, issued Jan. 25, 1983, as dispersing a liquid organopolysiloxane composition, convertible by ultraviolet radiation to the solid state, in a fluid continuous phase which is transparent to ultraviolet radiation. The organopolysiloxane consists essentially of an organopolysiloxane having an average of at least two radicals selected from the group consisting of vinyl and butenylene and a hydrogen-containing organopolysiloxane. Exposing the dispersion to ultraviolet radiation converts the liquid organopolysiloxane to the solid state. The microspheres can be removed from the dispersion by filtration or centrifuging and dried to obtain cured microspheres.

Japanese patent application 61 228064, published Oct. 10, 1986, teaches a photo-curing silicone emulsion prepared by emulsifying a composition comprising an organopolysiloxane containing a mercaptoalkyl-containing siloxane unit and vinyl-containing siloxane unit, polyvinylalcohol emulsifier, sensitizer, and water.

SUMMARY OF THE INVENTION

A silicone emulsion is prepared by emulsion polymerizing a hydroxyl endblocked polydiorganosiloxane oligomer with a combination of a siloxane or siloxane precursor containing unsaturated hydrocarbon groups where the hydrocarbon has from 2 to 6 carbon atoms, and a functional silicone selected from the group consisting of organosilicon hydrides and mercaptoalkylsilanes, or with an acryl or methacryl functional siloxane or silane. When the emulsion of the copolymer produced is combined with a photoinitiator, the copolymer can be crosslinked by exposure to ultraviolet radiation.

DESCRIPTION OF THE INVENTION

This invention relates to an aqueous silicone emulsion comprising a continuous water phase and a dispersed phase of a polydiorganosiloxane containing both unsaturated hydrocarbon group substituted siloxane units, in which said unsaturated hydrocarbon groups there are 2 to 6 carbon atoms, and either hydrogen on silicon substituted siloxane units or mercaptoalkylsiloxane units, and a photoinitiator, in the same dispersed particles. When exposed to ultraviolet light, the dispersed phase becomes crosslinked by reaction between the unsaturated hydrocarbon groups and either the hydrogen on silicon substitited siloxane units or the mercaptoalkylsiloxane units, whichever groups have been used. When the emulsion containing the crosslinked dispersed phase is dried, an elastomer results.

This invention also relates to an aqueous silicone emulsion comprising a continuous water phase and a dispersed phase of a polydiorganosiloxane containing acryl or methacryl functional siloxane units and a photoinitiator. When exposed to ultraviolet light, the dispersed phase becomes crosslinked by reaction of the acryl functional siloxane units with each other. When the emulsion containing the crosslinked dispersed phase is dried, an elastomer results.

The silicone emulsions of this invention can be crosslinked by exposure to ultraviolet light. When the water is removed from the crosslinked emulsion, an elastomer is produced. The elastomer can be reinforced by the addition of aqueous, dispersed reinforcing ingredients such as colloidal silica, clay, or dispersed fumed silica to the emulsion prior to the removal of the water. Addition of extending filler and/or thickener can result in a paste material which is suitable as a sealant.

The silicone emulsions of this invention can be produced by various methods. One method comprises: (A) homogenizing in water a mixture of (I) 100 parts by weight of hydroxyl endblocked polydiorganosiloxane (1), (II) 0.1 to 10 parts by weight of siloxane or siloxane precursor containing unsaturated hydrocarbon groups having from 2 to 6 carbon atoms (2), and (III) functional silicone selected from the group consisting of 0.1 to 10 parts by weight of organosilicon hydride (3) and from 0.1 to 5.0 part by weight of mercaptoalkylsilane or mercaptoalkylsiloxane (4), (IV) sufficient surfactant (5) to polymerize the ingredients in the desired time and to lower the pH to below 5, and (V) sufficient photoinitiator (6) to provide the desired cure rate, (B) emulsion polymerizing the mixture of (A) to produce a copolymer of ingredients (1), (2), and (3) or (4), (C) terminating polymerization by raising the pH to greater than 5, then (D) photochemically crosslinking the copolymer of B by exposure to ultraviolet light, to give an emulsion comprising a continuous water phase and a dispersed phase comprising a crosslinked polydiorganosiloxane.

Another method comprises: (A) homogenizing in water a mixture of (I) 100 parts by weight of hydroxyl endblocked polydiorganosiloxane (1), (II) from 0.1 to 5.0 part by weight of acryl or methacryl functional siloxane or silane (7), (III) sufficient surfactant (5) to polymerize the ingredients in the desired time and to lower the pH to below 5, and (IV) sufficient photoinitiator (6) to provide the desired cure rate, (B) emulsion polymerizing the mixture of (A) to produce a copolymer of ingredients (1) and (7), then (C) photochemically crosslinking the copolymer of (B) by exposure to ultraviolet light, to give an emulsion comprising a continuous water phase and a dispersed phase comprising a crosslinked polydiorganosiloxane.

Another method comprises: (A) homogenizing in water a mixture of (I) 100 parts by weight of hydroxyl endblocked polydiorganosiloxane (1), (II) a functional silicone selected from either 0.1 to 10 parts by weight of siloxane or siloxane precursor containing unsaturated hydrocarbon groups having from 2 to 6 carbon atoms (2) or from the group consisting of from 0.1 to 10 parts by weight of organosilicon hydride (3) and from 0.1 to 5.0 part by weight of mercaptoalkylsilane or mercaptoalkylsiloxane (4), (III) sufficient surfactant (5) to polymerize the ingredients in the desired time and to lower the pH to below 5, and (IV) sufficient photoinitiator (6) to provide the desired cure rate, (B) emulsion polymerizing the mixture of A to produce a copolymer of (1) and either (2), (3) or (4), (C) terminating polymerization by raising the pH to greater than 5, (D) adding the functional silicone (a) or (b) not selected in step (A) as ingredient (2), then (E) aging the mixture to allow the ingredient added in step (D) to migrate into the particle resulting from step (C), then (F) photochemically crosslinking the copolymer of (B) by exposure to ultraviolet light, to give an emulsion comprising a continuous water phase and a dispersed phase comprising a crosslinked polydiorganosiloxane.

The hydroxyl endblocked polydiorganosiloxane (1) is preferably chosen so that it has a viscosity of less than 0.1 Pa.s at 25° C. so that it can be easily emulsified. The organo groups are substituted or unsubstituted saturated hydrocarbon radicals of from 1 to 6 carbon atoms such as methyl, ethyl, propyl, phenyl, and 3,3,3-trifluoropropyl radicals. The preferred polydiorganosiloxane is hydroxyl endblocked polydimethylsiloxane having a viscosity of less than 0.1 Pa.s at 25° C.

The siloxane or siloxane precursor containing unsaturated hydrocarbon groups having from 2 to 6 carbon atoms (2) should be a siloxane or siloxane precursor which is compatible with the hydroxyl endblocked polydiorganosiloxane. The unsaturated groups are such as vinyl, allyl, and hexenyl. Preferably, the siloxane should be a siloxane which can be copolymerized with the polydiorganosiloxane during the emulsion polymerization. Suitable siloxanes include methylvinylcyclosiloxane having 4 to 6 siloxane units per molecule and low molecular weight linear polymers of methylvinylsiloxane, preferably hydroxy endblocked.

A siloxane precursor is a silane having two hydrolyzable groups on silicon, such as alkoxy or halogen, which will hydrolyze to give a siloxane. This siloxane then becomes incorporated into the diorganosiloxane polymer during the process of emulsion polymerization. The siloxane precursor should not be a silane having hydrolyzable groups which can cleave the hydrogen on silicon bond in an aqueous environment, such as diaminofuntional silanes. Siloxane precursors include methylvinyldialkoxysilanes, such as methyvinyldiethoxysilane. Also included are allyl or hexenyl functional siloxanes and siloxane precursors, such as allylmethyldiethoxysilane. Preferably there is from 0.1 to 10 parts by weight of siloxane or siloxane precursor containing unsaturated hydrocarbon groups per 100 parts by weight of hydroxyl endblocked polydiorganosiloxane. A preferred embodiment uses a mixture of methylvinylcyclosiloxanes at a level of 0.5 part by weight per 100 parts by weight of hydroxyl endblocked polydiorganosiloxane.

The organosilicon hydride (3) should be a silane or siloxane which is compatible with the hydroxyl endblocked polydiorganosiloxane. Preferably, it should be a hydride which can be copolymerized with the polydiorganosiloxane during the emulsion polymerization. Suitable hydrides include polymethylhydrogensiloxane fluid having a viscosity of less then 0.1 Pa.s and 25° C., methylhydrogencyclosiloxane having 4 to 6 siloxane units, and hydrolyzable organosilicon hydride such as methyldiethoxysilane. Preferably, there is from 0.1 to 10 percent by weight of the organosilicon hydride per 100 parts by weight of the hydroxyl endblocked polydiorganosiloxane. A preferred embodiment uses from 0.3 to 0.5 part by weight of methylhydrogencyclosiloxane per 100 parts of polydiorganosiloxane. Preferably there is 1 mole of hydrogen on silicon per mole of unsaturated hydrocarbon on silicon.

It is also possible to use siloxanes containing unsaturated hydrocarbon groups and to use organosilicon hydrides which function as endblockers. In these cases however, they must be used in conjunction with the corresponding ingredient that leads to a crosslinked structure. For example, when an endblocking vinyl-containing siloxane, such as dimethylvinylethoxysilane is used, a non-endblocking organosilicon hydride, such as polymethylhydrogensiloxane or methyldiethoxysilane, should be used.

The mercaptoalkylsilicone (4) should be a silane or siloxane which is compatible with the hydroxyl endblocked polydiorganosiloxane. Preferably it should be a mercaptoalkylsiloxane or siloxane precursor which can be copolymerized with the polydiorganosiloxane during the emulsion polymerization. Suitable mercaptoalkylsiloxanes include poly(mercaptopropyl(methyl))siloxane fluid having a viscosity of less than 0.1 Pa.s at 25° C. and hydrolyzable mercaptoalkylsilane precursor such as mercaptopropyl(methyl)diethoxysilane. A preferred embodiment uses mercaptopropyl(methyl)dimethoxysilane at a level of 0.5 to 1.0 part by weight per 100 parts by weight of polydiorganosiloxane. Preferably there is used 1 mole of mercaptoalkylsiloxane unit per mole of unsaturated hydrocarbon unit.

The acryl or methacryl functional siloxane (7) is a low molecular weight linear siloxane, preferably hydroxyl endblocked, a polysiloxane, or a hydrolyzable siloxane precursor, such as 3-methacryloxypropylmethyldimethoxysilane, all containing 1 or more acryl or methacryl functional radicals. Preferred acryl or methacryl functional siloxanes and acryl or methacryl functional silanes include 3-methacryloxypropylmethyldimethoxysilane, 3-methacryloxypropylmethyldiethoxysilane, 3-acryloxypropylmethyldimethoxysilane, and tetra(3-methacryloxypropyl)tetramethylcyclotetrasiloxane at a level of from 0.5 to 1.0 part by weight per 100 parts by weight of polydiorganosiloxane.

The photoinitiator (6) can be one or a combination of the many photoinitiators that form radical species when irradiated with ultraviolet light. The photoinitiator should be compatible with the silicone phase of the emulsion. Preferred photoinitiators are benzophenone and Darocure (R) 1173, which has the formula,

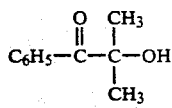

The photoinitiator is used in amounts sufficient to provide the desired cure rate. If too little is used, the cure takes longer than desired. If too much photoinitiator is used, the physical and mechanical properties of the emulsion or cured elastomer may be degraded. The preferred amount is from 0.25 to 0.5 part of either preferred photoinitiator per 100 parts by weight of polydiorganosiloxane.

The surfactant (5) can be a surface active sulfonic acid, such as are described in U.S. Pat. No. 3,294,725, issued Dec. 27, 1966, which is incorporated by reference to show suitable surfactants and their method of manufacture. When this type of surface active surfactant is used, the copolymerization of the ingredients begins as soon as the emulsion is formed. The emulsion polymerization is continued until the desired degree of polymerization has taken place, then the polymerization is terminated by raising the pH to greater than 5. The rate of polymerization is proportional to the amount of surfactant used. Sufficient surfactant must be present to lower the pH to less than 5, preferably to less than 3. About 2 parts by weight of dodecylbenzenesulfonic acid per 100 parts by weight of polydiorganosiloxane (1) has been found to give the desired degree of polymerization in about 24 hours at room temperature.

The surfactant (5) can also be an alkyl sulfate. A preferred surfactant is the alkyl sulfate, sodium lauryl sulfate. This surfactant can be mixed with the ingredients and homogenized to form a stable emulsion, then be converted to hydrogen lauryl sulfate by the addition of an acid, such as hydrochloric acid. This is then an active polymerization catalyst and promotes the emulsion copolymerization of the ingredients, (I), (II), and (III). Sufficient acid, such as 4N hydrochloric acid, should be added to lower the pH to less than 5, preferably less than 3. The amount of sodium lauryl sulfate is preferably from 1 to 3 parts by weight per 100 parts by weight of the polydiorganosiloxane (1).

The aqueous silicone emulsion of this invention comprises a continuous water phase and a dispersed phase of a polydiorganosiloxane copolymer which can be crosslinked either with itself or with a functional siloxane also present in the same emulsion particle through the use of a photoinitiator and exposure to ultraviolet light. One method forms a copolymer in which an unsaturated hydrocarbon group, such as vinyl, and either a hydrogen-on-silicon group or a mercaptoalkyl group are present in the same molecule. Ultraviolet light in the presence of the photoinitiator causes these groups to react to form crosslinks. Another method forms a copolymer in which ultraviolet light and photoinitiator cause acryl groups present in the copolymer molecule to react with acryl groups present in other copolymer molecules to provide crosslinking. Another method forms a copolymer in which either an unsaturated hydrocarbon group, or a hydrogen-on-silicon, or a mercaptoalkyl group is present in the copolymer molecule. A functional silane or siloxane having either an unsaturated hydrocarbon group, or a hydrogen-on-silicon, or a mercaptoalkyl group is added to the emulsion containing the copolymer, the functional group chosen depending upon what functional group was chosed to form the copolymer, and then the functional silane or siloxane is allowed to migrate into the emulsion particle containing the copolymer. This silane or siloxane must have 2 or more reactive functional groups so that it can function as a crosslinking agent. The reactive groups are chosen so that an unsaturated hydrocarbon group and a hydrogen-on-silicon or a mercaptoalkyl group is present in the particle so they can react to give crosslinking. For example, if vinyl is present in the copolymer, then either a hydrogen-on-silicon or a mercaptoalkyl crosslinking agent is added to the emulsion. If hydrogen-on-silicon is present in the copolymer, then an unsaturated hydrocarbon group containing silane or siloxane crosslinker is added.

In each of the methods of this invention, the hydroxyl endblocked polydiorganosiloxane is emulsion polymerized with another siloxane or siloxane precursor to form a copolymer by homogenizing with water, using the surfactant to form an emulsion. The emulsion is an oil in water emulsion of the polydiorganosiloxane and the other required reactive ingredient in the micelles. This emulsion is then polymerized to create a copolymer of the above ingredients. If a surface active sulfonic acid, such as described above, is used in the process, the polymerization process will begin as soon as the emulsion is formed, since these surfactants are active polymerization catalysts for siloxane polymerization. If an alkyl sulfate such as sodium lauryl sulfate is used to form the emulsion, the polymerization will not occur until a surface active sulfonic acid is added, or until the sodium lauryl sulfate is converted to hydrogen lauryl sulfate by the addition of an acid, such as dilute hydrochloric acid. This later process is the preferred process since it is then possible to form the emulsion in a homogenizer without any problem of polymerization taking place in the homogenizer. After the emulsion has been formed in a homogenizer, it can be placed in a container and mixed with the acid to initiate polymerization. Polymerization takes place at room temperature. The time to achieve a useful degree of polymerization is usually about 24 hours. The time can be shortened by raising the temperature. Polymerization should be continued until the copolymer has a molecular weight of at least 5000 as there is very little physical strength to the crosslinked polymer at lower degrees of polymerization. Preferably the molecular weight should be above 50,000, with the most preferred molecular weights between 200,000 and 700,000. After the desired molecular weight is reached, the polymerization is stopped by raising the pH of the emulsion to greater than 5. This is best done by the addition of dilute basic compound, such as an organic amine, an alkali metal hydroxide, or a combination.

The last method described above varies from the above discussion in that the required reactive ingredients are not all initially present in the copolymer. One of the reactive ingredients is present in the copolymer, then the corresponding reactive ingredient is added to the emulsion containing the copolymer and the mixture is aged to allow the added ingredient to migrate into the emulsion particle containing the copolymer. This procedure also results in all of the reactive ingredients being present in the same emulsion particle.

In order for the emulsion to form an elastomer, the copolymer must be crosslinked. The crosslinking can take place when the copolymer is still in the emulsion, or when the emulsion has been dried to give a film or coating of the copolymer. Preferably, the copolymer is crosslinked while it is in the form of an emulsion. The copolymer is crosslinked by exposing the emulsion, or copolymer, to ultraviolet light. The photoinitiator present in the emulsion reacts in the presence of the ultraviolet light to form radicals which cause the reactions, in the one case, the vinyl groups with either the hydrogen-on-silicon atoms or mercaptoalkyl groups present in the copolymer, causing crosslinks, thus changing the gum copolymer into an elastomer. In the other case, the radicals formed by the ultraviolet light and the photoinitiator cause the acryl groups to react with each other, cuasing crosslinks to form and changing the gum copolymer into an elastomer. When the crosslinked emulsion is cast into a film and dried, the elastomeric micelles coalesce to form an elastomeric film. It is also possible to first remove the water from the emulsion and then expose the copolymer to ultraviolet light to cause the crosslinking. The emulsion containing the mercaptoalkyl group as the reactive crosslinker can be crosslinked by exposure to ambient sunlight, since this is the most reactive crosslinking group.

Additional ingredients can be added to the emulsion to change the properties of the emulsion and of the elastomer formed by drying the emulsion. The physical strength of the elastomer can be increased by the addition of reinforcing filler. Any of the well known reinforcing fillers for silicone polymers can be used, such as fumed silica, precipitated silica, aqueous dispersed colloidal silica, and aqueous, dispersed fumed silica. The aqueous, dispersed fumed silica is a preferred reinforcing filler. Extending filler, such as clay and calcium carbonate, pigments, dyes, thickening agents, and such can be added as long as they do not adversely affect the properties or storage stability of the emulsion or the elastomer formed upon drying the emulsion.

The emulsion of this invention is useful as a coating material which gives an elastomeric coating. It can be used as a protective coating or as a release coating. When reinforced, the elastomeric coating can be used as a coating material, an adhesive, or as a sealant material.

The amount of ultraviolet radiation necessary to crosslink emulsion copolymer into an elastomer will depend on a number of variables and therefore, the optimum amount should be determined experimentally. Factors such as wavelength of UV light, amount and type of photoreactive functional groups in the copolymer, quantity and type of photoinitiator and reactor design will all influence the amount of ultraviolet radiation required to precrosslink emulsion polymer. For example, the energy required to dissociate SH bonds into radicals is far less than that required to dissociate SiH bonds and thus emulsion copolymers containing the former require significantly less ultraviolet radiation to complete crosslinking processes than do emulsion copolymers containing the latter.

Reactor design will also play a significant role in the amount of ultraviolet radiation required to precrosslink emulsion copolymers described in this invention. The most efficient reactor would probably be designed so that a thin film of emulsion is irradiated in order to maximize exposure of the emulsion copolymer particles to ultraviolet radiation. Such reactor might consist of a cell through which emulsion copolymer is pumped while it is being irradiated with ultraviolet light. The cell would be constructed such that emulsion is spread into a thin film at the point of exposure to ultraviolet radiation.

The reactor used to precrosslink emulsion copolymers described in this invention was designed only to demonstrate the concept and it does not represent a reactor having an optimized performance. This reactor consists of a cylindrical quartz vessel (approximately 1 liter capacity) equipped with a mechanical stirrer and it is placed inside a commercially available laboratory photochemical reactor (Rayonet (®) 100). The Rayonet 100 consists of a circular array of 16 ultraviolet lights surrounded by a cylindrical reflector. The Rayonet has a central cavity in which the quartz vessel is placed such that the lights surround the vessel. Photolysis occurs at the vessel's periphery and since the emulsion is stirred, when given enough time, all of the emulsion particles are eventually exposed to sufficient ultraviolet radiation to cause crosslinking of the emulsion copolymer. An obvious disadvantage of this type of reactor is that the area of exposure of the emulsion to ultraviolet light is very low and hence the photo-crosslinking process requires a considerable amount of time. By increasing this area of exposure to ultraviolet light, the amount of time required to precrosslink emulsion copolymers described in this invention could be shortened significantly. The ultraviolet lamps used in the Rayonet 100 had their maximum output at a wavelength of 2537 nanometers (nm). A device to measure the energy was placed inside the Rayonet and several measurements were taken, the average of which was 240 millijoules/cm2/min.

The following examples are included for illustrative purposes only and should not be construed as limiting the invention which is properly set forth in the appended claims. All parts are parts by weight.

EXAMPLE 1

A mixture was prepared by stirring together 643.4 g of a hydroxyl endblocked polydimethylsiloxane fluid having a degree of polymerization of about 35, 2.26 g of trimethylsiloxy endblocked polymethylhydrogensiloxane having a viscosity of about 0.13 Pa.s at 25° C. and a silicon-bonded hydrogen atom content of about 1.6 percent by weight, 3.24 g of methylvinylcyclosiloxane and 3.24 g of benzophenone until a solution resulted. Then 25 g of a surfactant solution containing 30 percent sodium lauryl sulphate in water was added and then 309.8 g of distilled water and stirring continued for 30 minutes. The mixture was then passed through a single stage laboratory homogenizer at a pressure of 7,500 psi to give an oil in water emulsion having an average particle size of about 0.33 micrometers. The emulsion was polymerized by adding 8 g of 4N hydrochloric acid and shaking in a closed container for several minutes to achieve a uniform mixture, then allowing to stand without agitation for 24 hours at 25° C. to complete the polymerization process. The polymerization was terminated by adding enough diethylamine solution to raise the pH of the emulsion to 6.5 to 7.0. The emulsion was about 62 percent solids, the polymer consisted of 5 weight percent methylvinylsiloxane units and 3.5 weight percent methylhydrogen units, with an average molecular weight (weight average) of about 240,000. The emulsion contained 0.5 weight parts per hundred of benzophenone, based upon polymer weight.

A portion of the emulsion was poured onto a plastic sheet and allowed to dry in air for 24 hours. Irradiation of the film for 1 minute with a UV light from a medium pressure Mercury lamp transformed the film from a tacky, gummy material to an elastomer.

A 200 g portion of the emulsion was placed in a jacketed quartz vessel equipped with a mechanical stirrer. The apparatus was placed inside a photochemical reactor consisting of a circular array of 16 ultraviolet lamps mounted vertically and surrounded by a reflector. Each lamp had an output of about 20 watts and a wavelength of about 300 nanometers. The stirrer was started, cooling water was circulated through the jacket of the vessel, and the lamps were illuminated. The emulsion was photolyzed for a total of 17 hours, with portions being removed from the reactor after 5 hours and after 11 hours of exposure.

Films were cast of each portion of the emulsion and allowed to dry. Each dried film was elastomeric.

Each of the portions was mixed with sufficient aqueous, dispersed, fumed silica (Cabosperse SC-2) to give 15 parts of fumed silica per 100 parts of polymer. Films were cast of each reinforced emulsion and allowed to dry for 7 days. The dried films were cut into test pieces and the tensile strength and elongation at break were mesured with the results shown in Table I.

TABLE I

| Photolysis Time Elongation Hours | Tensile Strength mPa | Ultimate percent |
|---|---|---|
| 5 | 1.02 | 780 |
| 11 | 1.34 | 950 |
| 17 | 1.58 | 975 |

EXAMPLE 2

A mixture was prepared of 640.8 g of a hydroxyl endblocked polydimethylsiloxane fluid of a degree of polymerization (DP) of about 35, 3.24 g of mixed methylvinylcyclosiloxanes, 6.22 g of mercaptopropylmethyldimethoxysilane and 3.24 g of benzophenone, then the mixture was stirred for about one hour until a solution resulted. Then 25 g of a 30 percent aqueous solution of sodium lauryl sulfate and 309.8 g of deionized water were added and the mixture was stirred for 30 minutes. Next the mixture was homogenized using a laboratory single stage homogenizer at 7500 psi to produce an emulsion having an average particle size of 0.3 micrometers and a solids content of about 62-65 percent by weight. The emulsion was polymerized by adding 6 g of 4N hydrochloric acid and stirring the emulsion for several minutes. The emulsion was allowed to stand at room temperature for 17 hrs in a closed container after which polymerization was terminated by adding sufficient 2 percent aqueous sodium hydroxide solution to raise pH to 6.5-7.5. This emulsion consisted of approximately 60 percent solids of particles made up of hydroxyl endblocked polydimethylsiloxane copolymer having 0.5 weight percent methylvinylsiloxy groups and 0.7 weight percent mercaptopropylmethylsiloxy groups and also containing 0.5 part by weight photoinitiator per 100 parts of the copolymer.

A film was cast from this emulsion by pouring 8.0 g of emulsion into a 100 mm diameter plastic petri dish and allowing it to dry under ambient conditions for 4 days. The resulting film was elastomeric.

A reinforced elastomeric film was prepared by mixing 20 g of this emulsion with 10.3 g of aqueous, dispersed, fumed silica (Cabosperse SC-2) having a percent solids by weight of 18 and a surface area of 160 m²/g. This mixture was shaken in a closed container for several minutes, centrifuged to exclude air bubbles and poured into a 100 mm diameter petri dish. After drying for two days at ambient conditions, the resulting film was elastomeric, but it was not overly strong. However, after exposure to ambient indoor sunlight for three weeks, mechanical properties of the film had significantly improved. The elastomer had an ultimate tensile strength of 375 psi and an ultimate elongation of 320 percent.

EXAMPLE 3

In this experiment, films from emulsions were exposed to a sunlamp for various times to effect cure.

An emulsion was prepared following the above procedure except the composition was prepared from the hydroxy endblocked polydimethylsiloxane fluid, 0.3 weight percent methylvinylcyclosiloxanes, 0.6 weight percent mercaptopropylmethyldimethoxysilane, 0.3 parts per hundred photoinitiator (Darcour 1173) and 15 parts per hundred dispersed, fumed silica (SC-2). Three films, approximately 20 mil thick, were cast and air dried for 1 day, after which they were placed under a 275 W sunlamp (mounted 50 cm above samples) for 16 hrs, 40 hrs and 64 hrs. The samples were tested (Instron) and the results are given in Table II.

TABLE II

| Exposure Time hours | Tensile Strength psi | Elongation percent |
|---|---|---|
| 16 | 160 | 320 |
| 40 | 290 | 400 |
| 64 | 350 | 400 |

EXAMPLE 4

A mixture was prepared from 9.73 g of 3-methacryloxy-propylmethyldiethoxysilane, 642.0 g of a hydroxyl endblocked polydimethylsiloxane of a degree of polymerization of about 35 and 3.24 g of Darocure 1173 and the mixture was stirred several minutes until it became homogeneous. Then 26.5 g of a 30 percent aqueous solution of sodium lauryl sulfate and 309.8 g of deionized water were added and the mixture was stirred for 30 minutes. This mixture was homogenized using a laboratory homogenizer at 7500 psi for 2 passes. The emulsion was polymerized by adding 6 g of 4 N hydrochloric acid followed by stirring for several minutes. Polymerization was allowed to proceed for 20 hrs at room temperature, after which it was terminated by raising the pH of the emulsion to 6.5-7.5 by the addition of 2 N sodium hydroxide. This resulting emulsion consisted of an approximately 62 percent by weight solids emulsion of hydroxyl endblocked polydimethylsiloxane/1 weight percent 3-methylacryloxypropylmethylsiloxane copolymer.

A 200 g portion of the above emulsion was placed in a jacketed quartz vessel equipped with a mechanical stirrer and the apparatus was placed inside the photochemical reactor of example 1. The stirrer was started, cooling water was circulated through the jacket of the vessel and the lamps were illuminated. The emulsion was photolyzed for 8 hours, after which it was removed from the reactor and a portion of it was poured into a film and allowed to dry under ambient conditions. The resulting film was elastomeric. Another portion of the photolyzed emulsion was mixed with aqueous, dispersed, fumed silica (Cab-O-Sperse SC-2) to give an emulsion containing 15 parts of silica per 100 parts of polymer. This emulsion was centrifuged lightly to exclude air bubbles and poured into a petri dish and allowed to air dry. After 1 week at ambient conditions, mechanical properties of the film were determined. The film had an ultimate tensile strength of 200 psi and an ultimate elongation of 170%.

EXAMPLE 5

This comparative example illustrates an emulsion which cures upon irradiation of the dried emulsion, but does not produce a cured film when the emulsion is irradiated before drying.

A mixture was prepared by stirring together 648.9 g of the hydroxyl endblocked polydimethylsiloxane fluid of example 1, 3.2 g of mixed methylvinylcyclosiloxanes, 5.5 g of dodecamethylcyclohexasilane, ((CH3)2Si)6, for about 10 minutes until a solution resulted. Then 25 g of a 30 percent aqueous solution of sodium lauryl sulfate and 309.8 g of deionized water were added and the mixture was stirred for 30 minutes. Next the mixture was homogenized using a laboratory single stage homogenizer at 7500 psi to produce an emulsion having an average particle size of 0.3 micrometer and a solids content of about 62 to 65 percent by weight. The emulsion was polymerized by adding 6 g of 4N hydrochloric acid and stirring the emulsion for several minutes. The emulsion was allowed to stand at room temperature for 17 hrs in a closed container after which polymerization was terminated by adding sufficient 2 percent aqueous sodium hydroxide solution to raise pH of the emulsion to 6.5-7.5. This emulsion consisted of an approximately 62 per cent solids emulsion copolymer of polydimethylsiloxane and 0.5 parts per hundred methylvinylsiloxane containing 0.85 parts per hundred dodecamethylcyclohexasilane.

A 200 g portion of the emulsion was placed in a jacketed quartz vessel equipped with a mechanical stirrer and the apparatus was placed inside a photochemical reactor (Rayonet), as in example 1. The stirrer was started, cooling water was circulated through the jacket of the vessel and the lamps were illuminated. The emulsion was photolyzed for 8 hours after which it was removed from the reactor and a portion of it was poured into a film and allowed to dry under ambient conditions. The resulting film was non-elastomeric; it consisted of a tacky polymer. The emulsion was put back into the photochemical reactor and again irradiated with UV light for another 8 hours. A portion of the emulsion was removed and allowed to dry under ambient conditions; it was also non-elastomeric. The emulsion was again irradiated for an additional 27 hours to provide a total of 43 hours irradiation time for the emulsion. A portion of this emulsion when dried under ambient conditions was also non-elastomeric.

An approximately 5 gram portion of the unirradiated emulsion was poured onto a plastic sheet and allowed to dry in air for 20 hrs. The resulting polymeric film was irradiated for one minute with UV light from a medium pressure mercury lamp. The polymer cured to an elastomer upon irradiation. Thus irradiation of the polymer in the absence of water caused it to cure into an elastomer while in the presence of water (while still emulsified), the polymer did not cure when irradiated.

That which is claimed is:

1. An aqueous silicone emulsion which dries to an elastomer comprising the product produced by
  (A) homogenizing in water a mixture of
    (I) 100 parts by weight of hydroxyl endblocked polydiorganosiloxane (1),
    (II) 0.1 to 10 parts by weight of siloxane or siloxane precursor containing unsaturated hydrocarbon groups having from 2 to 6 carbon atoms (2), and
    (III) functional silicone selected from the group consisting of 0.1 to 10 parts by weight of organosilicon hydride (3) and from 0.1 to 5.0 part by weight of mercaptoalkylsilicone (4)
    (IV) sufficient surfactant (5) to polymerize the ingredients in the desired time and to lower the pH to below 5, and
    (V) sufficient photoinitiator (6) to provide the desired cure rate,
  (B) emulsion polymerizing the mixture of (A) to produce a copolymer of ingredients (1), (2), and (3) or (4),
  (C) terminating polymerization by raising the pH to greater than 5, then
  (D) photochemically crosslinking the copolymer of (B) by exposure to ultraviolet light,
to give an emulsion comprising a continuous water phase and a dispersed phase comprising a crosslinked polydiorganosiloxane.

2. The emulsion of claim 1 in which there is sufficient surfactant to lower the pH to less that 5.

3. The emulsion of claim 1 in which there is from 0.25 to 0.5 parts by weight of photoinitiator (6) per 100 parts by weight of polydiorganosiloxane (1).

4. A method of producing an aqueous emulsion which dries to an elastomer, the method comprising
  (A) homogenizing in water a mixture of
    (I) 100 parts by weight of hydroxyl endblocked polydiorganosiloxane (1),
    (II) 0.1 to 10 parts by weight of siloxane or siloxane precursor containing unsaturated hydrocarbon groups having from 2 to 6 carbon atoms (2), and
    (III) functional silicone selected from the group consisting of 0.1 to 10 parts by weight of organosilicon hydride (3) and from 0.1 to 5.0 part by weight of mercaptoalkylsilicone (4),
    (IV) sufficient surfactant (5) to polymerize the ingredients in the desired time and to lower the pH to below 5, and
    (V) sufficient photoinitiator (6) to provide the desired cure rate,
  (B) emulsion polymerizing the mixture of (A) to produce a copolymer of ingredients (1), (2), and (3) or (4),
  (C) terminating polymerization by raising the pH to greater than 5, then
  (D) photochemically crosslinking the copolymer of (B) by exposure to ultraviolet light,
to give an emulsion comprising a continuous water phase and a dispersed phase comprising a crosslinked polydiorganosiloxane.

5. The method of claim 4 in which ingredient (5) is an alkyl sulfate, and step (B) consists essentially of adding an acid to convert the alkyl sulfate to hydrogen alkyl sulfate, and allowing polymerization to take place until the copolymer has a molecular weight of at least 5000.

6. The method of claim 4 in which there is sufficient surfactant to lower the pH to less that 5.

7. The method of claim 4 in which there is from 0.25 to 0.5 parts by weight of photoinitiator (6) per 100 parts by weight of polydiorganosiloxane (1).

8. An aqueous silicone emulsion which dries to an elastomer comprising the product produced by
  (A) homogenizing in water a mixture of (I) 100 parts by weight of hydroxyl endblocked polydiorganosiloxane (1),
(II) a functional silicone selected from either (a) 0.1 to 10 parts by weight of siloxane or siloxane precursor containing unsaturated hydrocarbon groups having from 2 to 6 carbon atoms (2) or from the group (b) consisting of from 0.1 to 10 parts by weight of organosilicon hydride (3) and from 0.1 to 5.0 part by weight of mercaptoalkylsilane or mercaptoalkylsiloxane (4),
(III) sufficient surfactant (5) to polymerize the ingredients in the desired time and to lower the pH to below 5, and
(IV) sufficient photoinitiator (6) to provide the desired cure rate,
(B) emulsion polymerizing the mixture of (A) to produce a copolymer of (1) and either (2), (3) or (4),
(C) terminating polymerization by raising the pH to greater than 5,
(D) adding the functional silicone (a) or (b) not selected in step (A) as ingredient 2, then
(E) aging the mixture to allow the ingredient added in step (D) to migrate into the particle resulting from step (C), then
(F) photochemically crosslinking the copolymer of (B) by exposure to ultraviolet light,
to give an emulsion comprising a continuous water phase and a dispersed phase comprising a crosslinked polydiorganosiloxane.

9. The emulsion of claim 8 in which there is sufficient surfactant to lower the pH to less that 5.

10. The emulsion of claim 8 in which there is from 0.25 to 0.5 parts by weight of photoinitiator (6) per 100 parts by weight of polydiorganosiloxane (1).

11. A method of producing an aqueous emulsion which dries to an elastomer, the method comprising
(A) homogenizing in water a mixture of
(I) 100 parts by weight of hydroxyl endblocked polydiorganosiloxane (1),
(II) a functional silicone selected from either (a) 0.1 to 10 parts by weight of siloxane or siloxane precursor containing unsaturated hydrocarbon groups having from 2 to 6 carbon atoms (2) or from the group (b) consisting of from 0.1 to 10 parts by weight of organosilicon hydride (3) and from 0.1 to 5.0 part by weight of mercaptoalkylsilane or mercaptoalkylsiloxane (4),
(III) sufficient surfactant (5) to polymerize the ingredients in the desired time and to lower the pH to below 5, and
(IV) sufficient photoinitiator (6) to provide the desired cure rate,
(B) emulsion polymerizing the mixture of A to produce a copolymer of (1) and either (2), (3) or (4),
(C) terminating polymerization by raising the pH to greater than 5,
(D) adding the functional silicone (a) or (b) not selected in step A as ingredient 2, then
(E) aging the mixture to allow the ingredient added in step (D) to migrate into the particle resulting from step (C), then
(F) photochemically crosslinking the copolymer of (B) by exposure to ultraviolet light,
to give an emulsion comprising a continuous water phase and a dispersed phase comprising a crosslinked polydiorganosiloxane.

12. The method of claim 11 in which there is sufficient surfactant to lower the pH to less that 5.

13. The method of claim 11 in which there is from 0.25 to 0.5 parts by weight of photoinitiator (6) per 100 parts by weight of polydiorganosiloxane (1).

14. An aqueous silicone emulsion comprising the product produced by
(A) homogenizing in water a mixture of
(I) 100 parts by weight of hydroxyl endblocked polydiorganosiloxane (1),
(II) 0.1 to 10 parts by weight of siloxane or siloxane precursor containing unsaturated hydrocarbon groups having from 2 to 6 carbon atoms (2), and
(III) from 0.1 to 5.0 part by weight of mercaptoalkylsilicone (4)
(IV) sufficient surfactant (5) to polymerize the ingredients in the desired time and to lower the pH to below 5, and
(V) sufficient photoinitiator (6) to provide the desired cure rate,
(B) emulsion polymerizing the mixture of (A) to produce a copolymer of ingredients (1), (2), and (4),
(C) terminating polymerization by raising the pH to greater than 5,
to give an emulsion comprising a continuous water phase and a dispersed phase comprising a polydiorganosiloxane polymer containing unsaturated hydrocarbon groups and mercaptoalkyl groups.

15. A method of forming a silicone elastomeric material comprising evaporating the water from the emulsion of claim 14, then exposing the dried emulsion to ambient sunlight to crosslink the polymer.

16. The emulsion of claim 14 in which there is sufficient surfactant to lower the pH to less that 5.

17. The emulsion of claim 14 in which there is from 0.25 to 0.5 parts by weight of photoinitiator (6) per 100 parts by weight of polydiorganosiloxane (1).

18. A method of producing an aquous silicone emulsion, said method comprising
(A) homogenizing in water a mixture of
(I) 100 parts by weight of hydroxyl endblocked polydiorganosiloxane (1),
(II) 0.1 to 10 parts by weight of siloxane or siloxane precursor containing unsaturated hydrocarbon groups having from 2 to 6 carbon atoms (2), and
(III) from 0.1 to 5.0 part by weight of mercaptoalkylsilicone (4)
(IV) sufficient surfactant (5) to polymerize the ingredients in the desired time and to lower the pH to below 5, and
(V) sufficient photoinitiator (6) to provide the desired cure rate,
(B) emulsion polymerizing the mixture of (A) to produce a copolymer of ingredients (1), (2), and (4),
(C) terminating polymerization by raising the pH to greater than 5,
to give an emulsion comprising a continuous water phase and a dispersed phase comprising a polydiorganosiloxane polymer containing unsaturated hydrocarbon groups and mercaptoalkyl groups.

19. The method of claim 18 in which there is sufficient surfactant to lower the pH to less that 5.

20. The emulsion of claim 18 in which there is from 0.25 to 0.5 parts by weight of photoinitiator (6) per 100 parts by weight of polydiorganosiloxane (1).

* * * * *